UNITED STATES PATENT OFFICE 2,471,261

MILDEW-PROOFING

Elmer W. Cook, New York, N. Y., and Philip H. Moss, Stamford, Conn., assignors to American Cyanamid Company, New York, N. Y., a corporation of Maine No Drawing. Application May 9, 1946, Serial No. 668,458

4 Claims. (Cl. 117—138.5)

This invention relates to the fungus-proofing or mildew-proofing of permeable organic materials, and more partcularly to the use of heavy metal salts of halogenated polyphenol sulfides as mildew-proofing agents. The invention includes the agents, their methods of preparation, and various materials impregnated therewith.

Our copending application, Serial No. 668,456, filed on even date herewith, describes the method of preparing various halogenated polyphenol sulfides and alkali metal salts thereof. These polymers possess unusually effective germicidal and fungicidal properties and are useful in soaps, sprays, lotions, and the like. Our copending application, Serial No. 668,457, filed on even date herewith, now U. S. Patent No. 2,459,063, describes a method of preparing various heavy metal salts of halogenated polyphenol sulfides from the products of the above first-mentioned application.

The present invention is based on the discovery that the heavy metal salts of halogenated polyphenol sulfides described in the latter-indicated application are particularly well suited for mildew-proofing textiles, leather, cork, and the like materials. These agents are unusually effective in preventing the growth of Aspergillus niger and Chaetomium globosum on permeable organic materials of the type of cellulosic textiles, hides and leather in various stages of leather manufacture, cork and similar material subject to fungus attack.

Halogenated polyphenol sulfides which have been found to be suitable as starting materials in the present invention are those containing from 3 to 10 or more phenol radicals. The phenol radicals may all be uniform or may be mixed, as for example, some of the radicals may be substituted by methyl, ethyl, propyl, etc., groups while others are halogenated. In every instance, however, the terminal phenol radicals are halogenated at their para positions, compounds halogenated at these positions having been found to possess the most desired characteristics.

The halogenated polyphenol sulfides are prepared by reacting halogenated and/or alkyl substituted phenols with sulfur chlorides at relatively low temperatures for periods of time of from about 1 to about 6 hours. In some instances it has been expedient to employ a catalyst, such as aluminum chloride, zinc chloride, or the like. In the preparation of a polymer containing 3 phenol radicals, 3 mols of the selected phenol may be reacted with 2 mols of the sulfur chloride, while if a polymer containing 4 phenol radicals is to be prepared, 4 mols of the phenol are reacted with 3 mols of the sulfur chloride, etc.

The polymers are water-insoluble, resinous materials which are soluble in aqueous alkali and the more common organic solvents such as ether, chloroform, isopropanol, dioxane, and the like. They may be converted to their alkali metal salts by reaction with, for example, the alkali metal hydroxides at relatively low temperatures and without employing any catalyst agent. The alkali metal salts of the polymers are ordinarily water-soluble materials which precludes their use as impregnants where the materials so impregnated are to be subjected to repeated washings.

From the aforegoing description it will be seen that the compounds of this invention have the general formula:

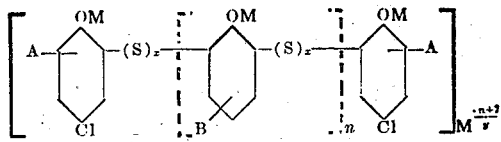

wherein M may be zinc, copper, calcium, barium, mercury, iron, magnesium, chromium, etc., A may be hydrogen or halogen, B may be halogen or alkyl, $x$ is 1 or 2, $n$ is a whole number not greater than 8, and $y$ is the valence of M.

In carrying out the method of the present invention the material to be impregnated with the novel mildew-proofing agents is first immersed in or sprayed with an aqueous solution of the alkali metal salt of the particular halogenated polyphenol sulfide to be used. The solution may be of any desired concentration, and the impregnation is preferably such that the impregnated material has a content of halogenated polyphenol sulfide salt of from about 0.01% to about 5%. For this purpose it has been found that solutions containing from about 0.5% to about 5% of the phenol sulfide salt give very satisfactory results in obtaining the desired content of the mildew-proofing agent in the impregnated material. The impregnated material is then immersed in or sprayed with an aqueous solution of a heavy metal salt such as for example the sulfate, nitrate, acetate, etc., salt of copper, zinc, magnesium, iron, mercury, barium, calcium or chromium. The alkali metal salts of the halogenated polyphenol sulfides are converted to their heavy metal salts by metathetical reaction at temperatures ranging from room temperature to about 100° C. without the aid of any catalytic agent. The heavy metal salts are precipitated on the material and, being water insoluble, are not removable therefrom by repeated washings with water. As indicated above the amount of mildew-proofing agent necessary for adequate protection of the material may vary between 0.01% and 5% of the water-insoluble halogenated polyphenol salt, based on the weight of the untreated material. However, it has been found that very satisfactory results are obtained when the impregnated material contains about 1% of the mildew-proofing agent. The impregnated material may be thereafter dried by any of the ordinarily employed methods including passage thereof over drum driers, through tentering machines, etc.

In order that the invention may be more thoroughly understood by those skilled in the art, the following examples are given, it being understood that these examples are primarily for the purpose of illustration, the scope of the invention being defined by the appended claims.

*Example*

900 g. of p-chlorophenol was dissolved in 1 liter of ethylene dichloride and heated to boiling. Under reflux conditions 400 cc. of sulfur dichloride was slowly added. When the evolution of HCl ceased, indicating that the reaction was completed, the solvent and dissolved HCl were removed. A yield of 1050 g. of tris (p-chlorophenylol) sulfide was obtained. The product was tan colored, amorphous, and was soluble in ethylene dichloride, ether, chloroform, aqueous alkali, etc.

The product was dissolved in 635 g. of isopropanol and reacted with 290 g. of sodium hydroxide in 435 cc. of water. The final solution was homogeneous and remained clear on dilution with water.

Cotton percale was immersed in a 1.0% aqueous solution of this sodium salt until the uptake of solution by the cloth was 100% of its dry weight. The impregnated cloth was then immersed for several minutes in an aqueous solution of CuSO4. The material was dried, and was found to contain about 1% by weight of the copper salt of tris (p-chlorophenylol) sulfide.

The impregnated material was tested according to U. S. Army Corps of Engineers Specification No. T-1212B for prevention of *Aspergillus niger* growth and according to U. S. Dept. of Agriculture Technical Bulletin No. 726 for prevention of *Chaetomium globosum* growth.

In the first instance the impregnated samples were thoroughly washed, sterilized, and were placed on agar plates which were completely covered with the white mycelial growth of *Aspergillus niger*. The plates were incubated for seven days at 30° C. When examined for mildew resistance, it was found that the washed impregnated samples had no growth upon them nor under them upon the agar plate. Untreated control samples were completely covered with mold growth.

Additional similarly impregnated samples were thoroughly washed, sterilized, and placed on mineral agar in square screw-capped bottles and were inoculated with a water suspension of *Chaetomium globosum*. The samples were incubated for 14 days at 30° C. When examined for mildew and rot resistance, the treated samples were found to have no growth upon them and their tensile strengths were substantially unaltered. Untreated control samples were covered with mold growth and were extremely weak, having been almost completedly rotted.

In similar manner, samples of cotton duck, cotton percale, and burlap containing various amounts of copper, zinc, calcium, barium etc. heavy metal salts of halogenated polyphenol sulfides containing from 3 to 10 phenol radicals were tested for mildew prevention. All of the heavy metal salts employed were unusually effective in preventing growth of both *Aspergillus niger* and *Chaetomium globosum*. In addition, rotting of the cloth, which is usually attributed to the action of the *Chaetomium globosum*, was prevented in every instance.

From the above detailed description of the invention it will be apparent to those skilled in the art that our novel compounds, and the methods of employing them, provide an effective means of preventing the growth of mildew on various permeable materials. The treated materials are thus effectively protected against discoloration due to mildew attack and, more important, the materials are prevented from rotting.

What we claim is:

1. A permeable organic material normally subject to attack by fungi, said material being mildew-proofed by a content of about 0.01% to about 5% of a heavy metal salt of a halogenated polyphenol sulfide containing from 3 to 10 phenol radicals, said halogenated polyphenol sulfide having the formula

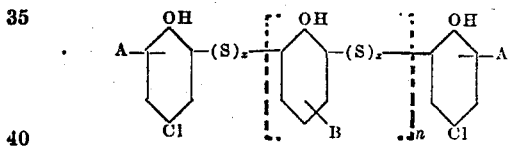

in which A is hydrogen or halogen, B is halogen or alkyl, $x$ is a whole number not greater than 2, and $n$ is a whole number not greater than 8.

2. A mildew-proof cellulosic textile material containing from about 0.01% to about 5% of a copper salt of tris (p-chlorophenylol) sulfide.

3. A mildew-proof cellulosic textile material containing from about 0.01% to about 5% of a copper salt of tris (p-chlorophenylol) disulfide.

4. A mildew-proof cellulosis textile material containing from about 0.01% to about 5% of a zinc salt of tris (p-chlorophenylol) sulfide.

ELMER W. COOK.
PHILIP H. MOSS.

REFERENCES CITED

The following references are of record in the file of this patent:

UNITED STATES PATENTS

| Number | Name | Date |
|---|---|---|
| 2,346,826 | Cook | Apr. 18, 1944 |
| 2,381,852 | Hochwalt | Aug. 7, 1945 |

FOREIGN PATENTS

| Number | Country | Date |
|---|---|---|
| 551,081 | Great Britain | Feb. 8, 1943 |